United States Patent
Holzmacher et al.

(10) Patent No.: US 9,308,900 B2
(45) Date of Patent: Apr. 12, 2016

(54) ELECTRIC PARKING BRAKE CONTROL SYSTEM

(75) Inventors: Rick Holzmacher, Springfield, IL (US); Zachary T. Spraetz, Rochester, IL (US); Al Cable, Springfield, IL (US); Matthew Brose, Davis, IL (US); John K. Tillotson, Petoskey, MI (US)

(73) Assignee: Honeywell International Inc., Morris Plains, NJ (US)

( * ) Notice: Subject to any disclaimer, the term of this patent is extended or adjusted under 35 U.S.C. 154(b) by 2108 days.

(21) Appl. No.: 12/364,214

(22) Filed: Feb. 2, 2009

(65) Prior Publication Data

US 2010/0194185 A1 Aug. 5, 2010

(51) Int. Cl.
| | | |
|---|---|---|
| B60T 13/26 | (2006.01) | |
| F16D 65/14 | (2006.01) | |
| B60T 7/12 | (2006.01) | |
| B60T 13/66 | (2006.01) | |
| B60T 13/68 | (2006.01) | |

(52) U.S. Cl.
CPC ............... B60T 7/12 (2013.01); B60T 13/662 (2013.01); B60T 13/683 (2013.01)

(58) Field of Classification Search
CPC ........ B60T 7/12; B60T 13/662; B60T 13/683
USPC .................................................. 303/3, 6.01, 7
See application file for complete search history.

(56) References Cited

U.S. PATENT DOCUMENTS

| | | | | |
|---|---|---|---|---|
| 3,966,011 A * | 6/1976 | Minami | ............... | B60T 7/12 180/176 |
| 4,561,527 A | 12/1985 | Nakamoto et al. | ............ | 192/4 C |
| 6,293,363 B1 | 9/2001 | Rangaswamy et al. | ........ | 180/287 |
| 6,447,074 B2 | 9/2002 | Engelhard | .......................... | 303/3 |
| 6,631,796 B2 | 10/2003 | Yanaka et al. | .............. | 192/219.4 |
| 6,752,472 B2 | 6/2004 | Bezzina | .............................. | 303/7 |
| 7,121,633 B2 | 10/2006 | Tachiiri et al. | ................... | 303/20 |
| 2003/0038533 A1* | 2/2003 | Bezzina | ............... | B60T 13/662 303/3 |
| 2004/0187674 A1* | 9/2004 | Bennett | ................. | B60T 13/268 91/418 |
| 2005/0093365 A1* | 5/2005 | McCann | ................. | B60T 13/68 303/3 |
| 2005/0116533 A1* | 6/2005 | Herges | .................. | B60T 13/263 303/3 |
| 2005/0162004 A1* | 7/2005 | Csak | ...................... | B60G 7/001 303/7 |
| 2007/0249465 A1 | 10/2007 | Barber et al. | .................. | 477/197 |
| 2008/0086252 A1 | 4/2008 | Nakayama | ....................... | 701/80 |
| 2008/0185235 A1 | 8/2008 | Suzuki | ..................... | 188/1.11 E |

FOREIGN PATENT DOCUMENTS

| | | | | |
|---|---|---|---|---|
| EP | 1060965 A2 | 12/2000 | .............. | B60T 11/10 |
| EP | 1300307 A2 | 4/2003 | ............... | B60T 7/10 |
| EP | 1300307 A3 | 10/2003 | ............... | B60T 7/10 |

(Continued)

*Primary Examiner* — Anna Momper
*Assistant Examiner* — San Aung
(74) *Attorney, Agent, or Firm* — Conley Rose, P.C.; Kristin Jordan Harkins

(57) ABSTRACT

An electric parking brake control system for automatically controlling one or more parking brakes in a vehicle. The parking brake control system includes an electric brake switch in communication with a low-pressure switch for automatically applying the parking brakes. The electric brake switch is preferably a latching type mechanism, which is capable of controlling a solenoid air valve external to the vehicle cab. The low-pressure switch automatically monitors an air reservoir for a low-pressure condition. The electric brake switch incorporates a time delay upon release of the switch, in order to prevent inadvertent application of the parking brakes due to a momentary loss of vehicle electrical power.

8 Claims, 2 Drawing Sheets

(56) References Cited

FOREIGN PATENT DOCUMENTS

| | | | | |
|---|---|---|---|---|
| EP | 1418103 A1 | 5/2004 | ................ | B60T 7/10 |
| EP | 1300307 B1 | 9/2005 | ................ | B60T 7/10 |
| EP | 1845495 A1 | 10/2007 | ................ | G07C 9/00 |
| WO | WO2004/056630 A1 | 7/2004 | ................ | B60T 7/10 |

\* cited by examiner

ELECTRIC PARKING BRAKE CONTROL SYSTEM

TECHNICAL FIELD

Embodiments are generally related to braking systems for use with vehicles. Embodiments are also related to electric switches. Embodiments are additionally related to control systems for controlling parking brakes in vehicles.

BACKGROUND OF THE INVENTION

A brake control system is generally utilized for engaging and disengaging a service brake and a parking brake associated with a vehicle. Service brakes are utilized to stop a moving vehicle slowly. Parking brakes are latching brakes utilized primarily for preventing the vehicle from moving from a parked position. Parking brakes may also be utilized in an emergency situation to slow the moving vehicle when the service brakes have failed to provide a redundant brake circuit. EPB (Electrical Parking Brake) systems include an EPB mechanism for applying an actuating force to the parking brake associated with the vehicle. The EPB mechanism is generally actuated in response to the operation of a push/pull hand lever located on a vehicle dash panel within a cab of the vehicle.

The vehicle may include more than one push/pull knob, depending upon whether or not an additional control is available for the parking brakes, such as in the case of a trailer attached to the vehicle. The push/pull knob is generally connected to an air valve, which controls the flow of air to the parking brake. In general, when the operator pushes the valve in, air pressure can be provided to the parking brake and the brake then released, thereby allowing the vehicle to move. In order to apply the brake, the operator pulls the push/pull knob and the air pressure is then removed from the parking brake, thereby allowing the brake to be engaged. When the knob is pushed in, the air pressure acts to engage the knob and maintain the knob in the pushed position.

Such push/pull knobs and air valves can be plumbed with air lines that are capable of being routed to and from the push/pull knobs located in the dash panel of the vehicle. Hence, the dash panel must be relatively large to accommodate such air lines. Additionally, such air lines are costly to install and to service because of the restricted space behind the dash panel. Furthermore, maintenance can be difficult in the case, for example, where an air leak is present in the valve or associated hoses. Such an air leak can be difficult to find and repair due to the restricted space of the dash panel.

Based on the foregoing, it is believed that a need exists for an improved electric parking brake control system for automatically controlling parking brakes. A need also exists for an improved electric brake switch with time delay capabilities for preventing inadvertent application of an electric parking brake, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved electric parking brake control system.

It is another aspect of the present invention to provide for an improved electric brake switch with time delay for preventing inadvertent application of the electric parking brake.

The aforementioned aspects and other objectives and advantages can now be achieved as described herein. An electric parking brake control system for automatically controlling at least one parking brake in a vehicle is disclosed. The parking brake control system includes an electric brake switch in communication with a low-pressure switch for automatically applying the parking brake. The electric brake switch is preferably a latching type mechanism, which controls a solenoid air valve external to the vehicle cab. The low-pressure switch automatically monitors an air reservoir for a low-pressure condition. The electric brake switch incorporates a time delay which delays release of the switch, in order to prevent the inadvertent application of the parking brake due to a momentary loss of vehicle electrical power.

The electric parking brake control system further includes a push/pull knob connected to a return spring. The electric brake switch can be depressed, which in turn provides a signal to the solenoid air valve, thereby causing the valve to move to an open position. In the open position, air from the reservoir can pass through the solenoid air valve and release the parking brake. When the electric brake switch is pulled, a circuit is opened, which moves the solenoid air valve to an exhaust position. The pressure to the parking brake then goes to atmospheric pressure and the parking brake can be applied. The low-pressure switch automatically returns the electric brake switch to the pulled position thereby opening the circuit and moving the latching solenoid air valve to an exhaust position when the pressure from a reservoir drops below a preset limit. The control system delays the application of the parking brake for a suitable short time interval, thereby preventing the inadvertent application of the parking brake due to a momentary loss of vehicle electrical power. Additionally, the control system can include a unique combination of electric brake switch, pressure switch, and control for desired automation and/or semi-automatic operations.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
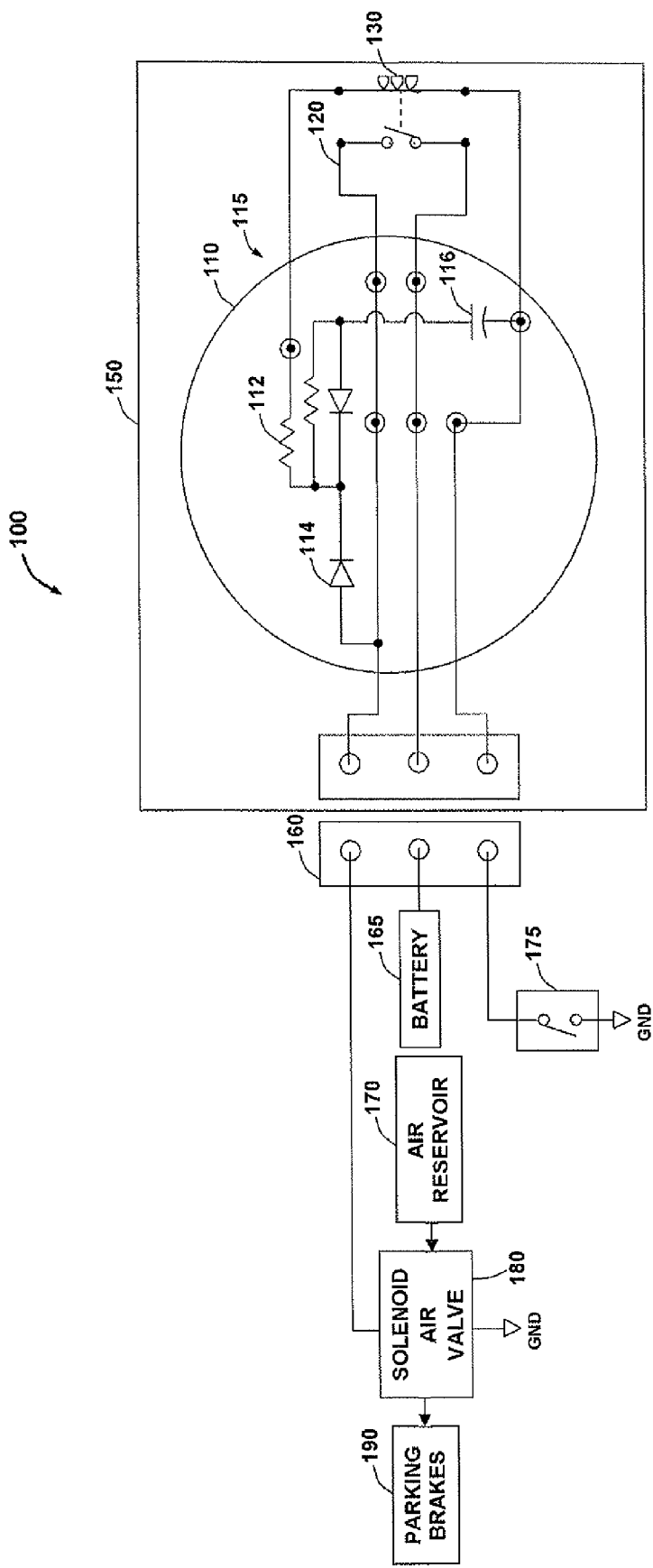
FIG. 1 illustrates a schematic view of an electric parking brake control system for automatically controlling a parking brake, in accordance with a preferred embodiment.

FIG. 1 illustrates a schematic view of an electric parking brake control system 100, in accordance with a preferred embodiment. The electric parking brake control system 100 can be utilized in the operation of a wide variety of different types of vehicles such as, for example, construction vehicles, according to the embodiment of the present invention. The electric parking brake control system 100 can be utilized for controlling at least one parking brake 190 associated with the vehicle. The parking brake control system 100 utilizes a series of electrically controlled valves that are in turn utilized to operate at least one valve to apply or release the vehicle's parking brakes 190. The electrically controlled valves are solenoid valves that can be utilized to induce a "change of state" in the vehicle's parking brakes, as described below.

The automatic electric parking brake control system 100 generally includes a solenoid air valve 180 that can be connected to an electric brake switch 150. In general, the solenoid air valve 180 is basically a simple electromechanical unit utilized to control the opening and closing of the valve 180. The parking brake system 100 further includes an air source 170, such as an air reservoir, for supplying air pressure. The air can be routed from the air reservoir 170 to the solenoid valve 180. A low-pressure switch 175 electrically communicates with the electric brake switch 150 via a connector 160. The low-pressure switch 175 automatically returns the electric brake switch to the pulled position thereby opening the circuit and moving the solenoid air valve 180 to an exhaust position when the pressure from the air reservoir 170 goes below a preset limit. The solenoid valve 180 can be electrically grounded via a grounding terminal (GND).

The electric brake switch 150 includes a PCB 110 incorporated with a time delay circuit 115. The PCB 110 generally includes a number of resistors 112, a number of diodes 114 and at least one capacitor 116 for electrical connections. A coil 130 can be connected to the resistor 112 and the capacitor 116. A switch 120 can be connected to the battery 165 and the solenoid air valve 180 for controlling the parking brakes 190. The connector 160 can be utilized to electrically connect the solenoid air valve 180, the battery 165, and the low-pressure switch 175 to the electric brake switch 150. Note that the term PCB refers generally to a printed circuit board, which can be utilized to mechanically support and electrically connect electronic components (e.g. resistors 112, diodes 114 and capacitors 116) via conductive pathways, or traces, etched from copper sheets laminated onto a non-conductive substrate.

The electric brake switch 150 can be a single pole momentary contact switch and is spring loaded to a normally off position. However, it will be apparent to those skilled in the art that other type of switches can be utilized as desired without departing from the scope of the invention. The electric brake switch 150 can be depressed which provides a signal to the solenoid air valve 180 causing the valve 180 to move to an open position. In the open position, air from the reservoir 170 can pass through the solenoid air valve 180 and release the parking brakes 190. When the electric brake switch 150 is pulled, a circuit is opened which moves the solenoid air valve 180 to an exhaust position. The pressure to the parking brake 190 then goes to atmospheric pressure and the parking brakes 190 can be applied.

The electric brake switch 150 can be ultimately connected to the vehicle's battery 165, which itself is grounded via the grounding terminal (GND). The time-delay circuit 115 can be utilized to change the state of the solenoid valve 180. Activation of the switch 120 moves the solenoid valve 180 in a position that disengages the parking brake. The time delay circuit 115 delays the de-activation of switch 120 for a short period of time when power is disrupted. Accordingly, the possibility of inadvertent brake application due to electrical failure can be avoided.

Figure 2:
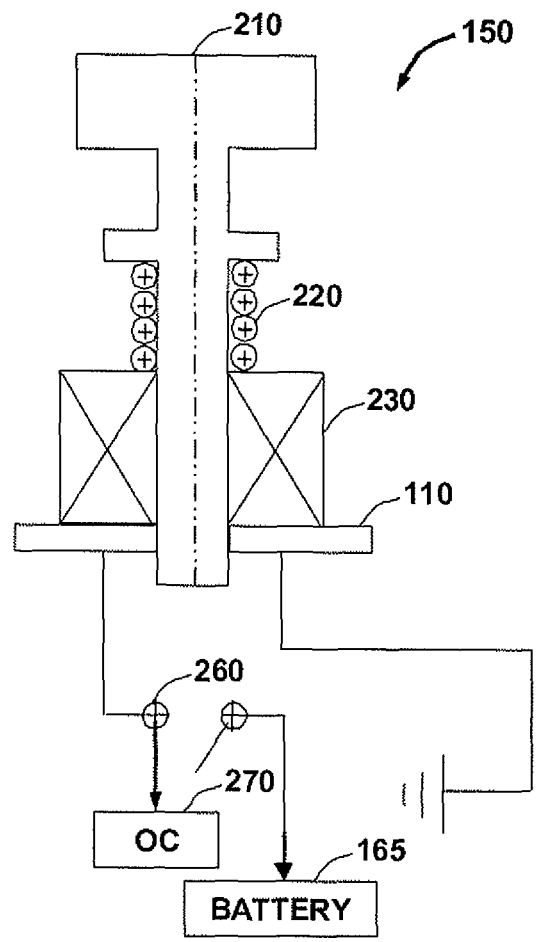
FIG. 2 illustrates a schematic view of an electric brake switch associated with the electric parking brake control system, in accordance with a preferred embodiment.

FIG. 2 illustrates a schematic view of the electric brake switch 150 associated with the electric parking brake control system 100, in accordance with a preferred embodiment. Note that in FIGS. 1-2, identical or similar blocks are generally indicated by identical reference numerals. The basic function of the parking brake system 100 according to the present invention is actuating or releasing the parking brake 190 when the vehicle stands still by operating a push/pull knob 210. The electric parking brake system 100 can be applied and released (on/off function) with regard to a predefined maximum force. When the push/pull knob 210 is in the pushed position, it can be released by the mechanical actuation of the operator or momentary loss of vehicle electrical power after a predetermined time delay. The electronic parking brake system 100 of the present invention includes the parking brake switch 150 adapted to deliver power from the battery 165 to desired elements of the parking brake system 100.

The electric brake switch 150 can be located in a dash panel (not shown) of the vehicle connected to the battery 165 for electric current and the solenoid air valve 180. The electric brake switch 150 generally includes the push/pull knob 210, a return spring 220, a hold in coil 230, and the PCB 110. The push/pull knob 210 can be operated by an operator of the vehicle, is pushed in to release the parking brakes 190, and pulled out to engage the parking brakes 190. When an operator pushes in the push/pull knob 210, the electric brake switch 150 is closed and the solenoid valve 180 is actuated, thus providing air pressure to the parking brakes 190.

As described above, when a low pressure is encountered in the air reservoir 170, the low-pressure switch 175 automatically moves the solenoid air valve 180 to the exhaust position by deactivating coil 130 and thereby opening switch 120. The electric brake switch 150 is of the latching type, which incorporates the time delay on release of the electric brake switch 150. The control system 100 delays the application of the parking brakes 190 for a suitable short time interval, thereby allowing the inadvertent application of the parking brakes 190 due to momentary loss of the vehicle's electrical power. Note that the electric brake switch 150 may also be applied to other types of electro-hydraulic systems.

Furthermore, the invention can include a unique combination of electric switch 150, low-pressure switch 175, and control for desired automation and/or semi-automatic operations. The switches 150 and 175 control solenoid air valves 180 external to the vehicle cab. The electric brake switch 150 is in communication with the pressure switch 175 for automatically applying the parking brakes 190. The electric parking brake control system 100 also includes a parking brake control unit and/or an output contact (OC) 270 for receiving an output signal 260 and generating a control signal for controlling a desired driving element of the parking brake system 100, based on the received signal.

In addition to realizing a control strategy for controlling the electric parking brake system 100, the OC 270 converts the driver's request signalized by the push/pull knob 210 into the relative control signals for the control of the electric parking brake system 100. The OC 270 includes an electronic controlling device with an alarm function (not shown), especially for controlling the application force and detecting the wear of the brake linings, as well as with diagnostic means and safety logic. On the basis of the information on the vehicle speed and the operating status of the vehicle, the electric parking brake control system 100 is operated according to the driving situation.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The brake control system 100 described herein also can be adapted for automatically controlling the parking brakes due to momentary loss of vehicle electrical power. Such system also reduces the space occupied in the dash panel due to the replacement of air-operated controls with the electric brake switch 150.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electric parking brake control system, comprising:
    a low pressure switch for monitoring a low pressure condition in an air reservoir, wherein said low pressure switch is movable between a first position, in which said low pressure switch is electrically connected to a circuit common, and a second position, in which said low pressure switch is electrically disconnected from the circuit common, and wherein said air reservoir supplies air at a predetermined pressure to at least one parking brake;
    at least one solenoid air valve movable between an open position, in which air pressure is applied to said at least one parking brake to thereby release said at least one parking brake, and an exhaust position, in which air pressure is removed from said at least one parking brake to thereby engage said at least one parking brake, wherein said low pressure switch automatically moves to the second position to thereby move said at least one solenoid air valve to the exhaust position when pressure from said air reservoir drops below a predetermined limit; and
    an electric brake switch in electrical communication with said low pressure switch in order to automatically apply said at least one parking brake, wherein said electric brake switch comprises:
        a push/pull knob movable between an engage position, in which said at least one solenoid air valve moves to the exhaust position, and a release position, in which said at least one solenoid air valve moves to the open position,
        a return spring engaging said push/pull knob and supplying a spring force thereto that urges said push/pull knob toward the engage position,
        a coil surrounding said push/pull knob and configured, upon being energized, to retain said push/pull knob is the release position against the spring force, and
        a time delay circuit electrically coupled to said coil and configured to maintain said coil energized, and thereby prevent an inadvertent application of said at least one parking brake, due to a momentary loss of electrical power.

2. The system of claim 1 wherein said at least one solenoid air valve is located external to a vehicle cab.

3. The system of claim 1 further comprising a connector for electrically connecting said electric brake switch, said solenoid air valve, and said low pressure switch.

4. The system of claim 1 wherein said electric brake switch applies said at least one parking brake based on a pressure condition associated with said air reservoir.

5. The system of claim 1 wherein said electric brake switch releases said at least one parking brake based on a pressure associated with said air reservoir.

6. The system of claim 1 wherein said electric brake switch delays an application of said at least one parking brake for a short time interval, thereby allowing a safe controlled application of said at least one parking brake.

7. The system of claim 1 further comprising a parking brake control unit for receiving an output signal and generating a control signal for controlling a desired driving element, based on a received signal.

8. The system of claim 1 wherein said electric brake switch comprises a latch mechanism.

\* \* \* \* \*